US012584743B2

(12) United States Patent
Albers

(10) Patent No.: US 12,584,743 B2
(45) Date of Patent: Mar. 24, 2026

(54) METHOD AND ASSEMBLY TO REDUCE EXTERNAL LASER LIGHT SCATTERING SOURCE IN RING LASER GYROSCOPE

(71) Applicant: Honeywell International Inc., Charlotte, NC (US)

(72) Inventor: Steven C Albers, Coon Rapids, MN (US)

(73) Assignee: Honeywell International Inc., Charlotte, NC (US)

( * ) Notice: Subject to any disclaimer, the term of this patent is extended or adjusted under 35 U.S.C. 154(b) by 266 days.

(21) Appl. No.: 18/470,163

(22) Filed: Sep. 19, 2023

(65) Prior Publication Data

US 2025/0093157 A1    Mar. 20, 2025

(51) Int. Cl.
 *G01C 19/66*     (2006.01)
 *G01C 25/00*     (2006.01)
(52) U.S. Cl.
 CPC ........... *G01C 19/662* (2013.01); *G01C 25/00* (2013.01)
(58) Field of Classification Search
 CPC ..... G01C 19/661; G01C 19/662; G01C 25/00
 See application file for complete search history.

(56) References Cited

U.S. PATENT DOCUMENTS

| | | | |
|---|---|---|---|
| 4,676,643 A | 6/1987 | Vescial | |
| 4,677,641 A | 6/1987 | Podgorski | |
| 4,821,282 A * | 4/1989 | Podgorski | ............ G01C 19/661 |
| | | | 356/469 |

| | | | |
|---|---|---|---|
| 4,865,436 A * | 9/1989 | Ahonen | ................... H01S 3/083 |
| | | | 359/872 |
| 5,311,538 A | 5/1994 | Thorland | |
| 5,386,289 A | 1/1995 | Thorland | |
| 7,916,302 B2 | 3/2011 | Fellows et al. | |
| 9,551,578 B1 * | 1/2017 | Baker | ................. G01C 19/661 |
| 9,651,379 B2 | 5/2017 | Anderson | |

(Continued)

FOREIGN PATENT DOCUMENTS

| | | | |
|---|---|---|---|
| EP | 0246352 B1 | 5/1991 | |
| GB | 2507240 A * | 4/2014 | ........... G01C 19/662 |

OTHER PUBLICATIONS

European Patent Office, "Extended European Search Report", dated Feb. 5, 2025, from EP Application No. 24196625.8, from Foreign Counterpart to U.S. Appl. No. 18/470,163, pp. 1 through 8, Published: EP.

*Primary Examiner* — Michael A Lyons
(74) *Attorney, Agent, or Firm* — Fogg & Powers LLC

(57)     ABSTRACT

A method of making a readout mirror for a ring laser gyroscope comprises forming an optical substrate component that includes a lower surface, a first upper surface portion substantially parallel to the lower surface, and a second upper surface portion angled with respect to the lower surface; performing a coarse polish of the second upper surface portion; forming an optical part having a first surface; performing a super polish of the first surface of the optical part; applying a first beam splitter layer to the super polished first surface of the optical part, to produce a beam splitter side of the optical part; and bonding the beam splitter side of the optical part, using an optical adhesive, to the coarse polished second upper surface portion of the substrate component, to produce a reflector member. The reflector member is configured to reduce external cavity light scattering in the ring laser gyroscope.

19 Claims, 3 Drawing Sheets

(56)  References Cited

U.S. PATENT DOCUMENTS

2006/0290940  A1      12/2006  Beaudet et al.
2008/0304076  A1 *   12/2008  Beckwith ............. G01C 19/661
                                                            356/480

* cited by examiner

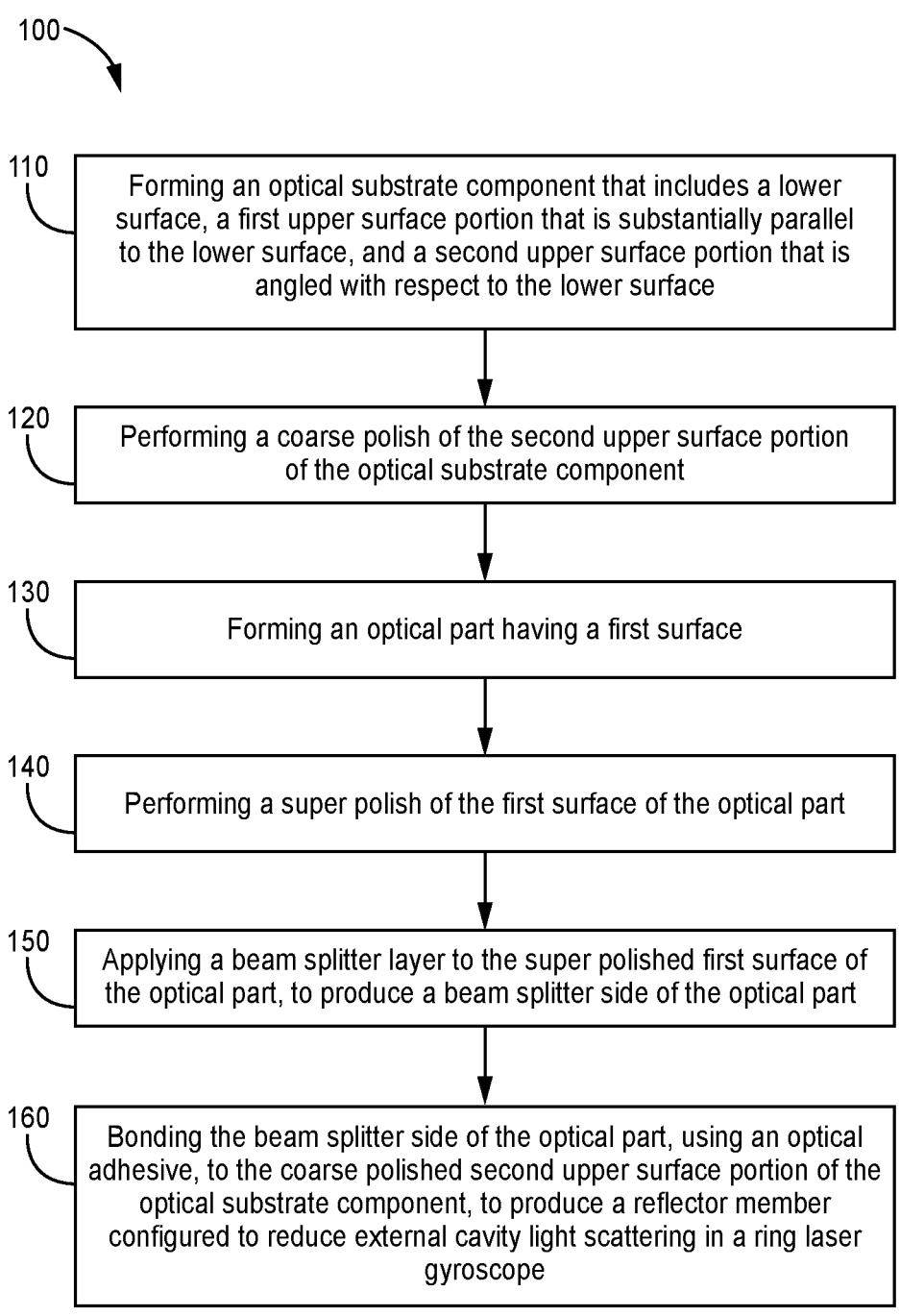

100

110 Forming an optical substrate component that includes a lower surface, a first upper surface portion that is substantially parallel to the lower surface, and a second upper surface portion that is angled with respect to the lower surface 120 Performing a coarse polish of the second upper surface portion of the optical substrate component 130 Forming an optical part having a first surface 140 Performing a super polish of the first surface of the optical part 150 Applying a beam splitter layer to the super polished first surface of the optical part, to produce a beam splitter side of the optical part 160 Bonding the beam splitter side of the optical part, using an optical adhesive, to the coarse polished second upper surface portion of the optical substrate component, to produce a reflector member configured to reduce external cavity light scattering in a ring laser gyroscope

FIG. 1

METHOD AND ASSEMBLY TO REDUCE EXTERNAL LASER LIGHT SCATTERING SOURCE IN RING LASER GYROSCOPE

BACKGROUND

The performance of various ring laser gyroscopes with respect to noise/angle random walk (ARW) can be influenced by an external laser beam scatter source. It is known that an external laser beam scatter source is the quality of a backside wedge mirror surface, where the laser beam reflects off a beam splitter coating on the backside wedge mirror surface.

Currently, some ring laser gyroscopes have difficultly producing enough high grade/low noise sensors to satisfy users. Given that the gyroscope noise/ARW is being influenced by external backscatter sources, methods to mitigate this issue are needed.

SUMMARY

A method of making a readout mirror for a ring laser gyroscope comprises forming an optical substrate component that includes a lower surface, a first upper surface portion that is substantially parallel to the lower surface, and a second upper surface portion that is angled with respect to the lower surface; performing a coarse polish of the second upper surface portion of the optical substrate component; forming an optical part having a first surface; performing a super polish of the first surface of the optical part; applying a first beam splitter layer to the super polished first surface of the optical part, to produce a beam splitter side of the optical part; and bonding the beam splitter side of the optical part, using an optical adhesive, to the coarse polished second upper surface portion of the optical substrate component, to produce a reflector member for the readout mirror. The reflector member is configured to reduce external cavity light scattering in the ring laser gyroscope.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 1 is a flow diagram of a method for making a reflector member of a readout mirror for a ring laser gyroscope, according to one implementation;

DETAILED DESCRIPTION

Figure 2A:
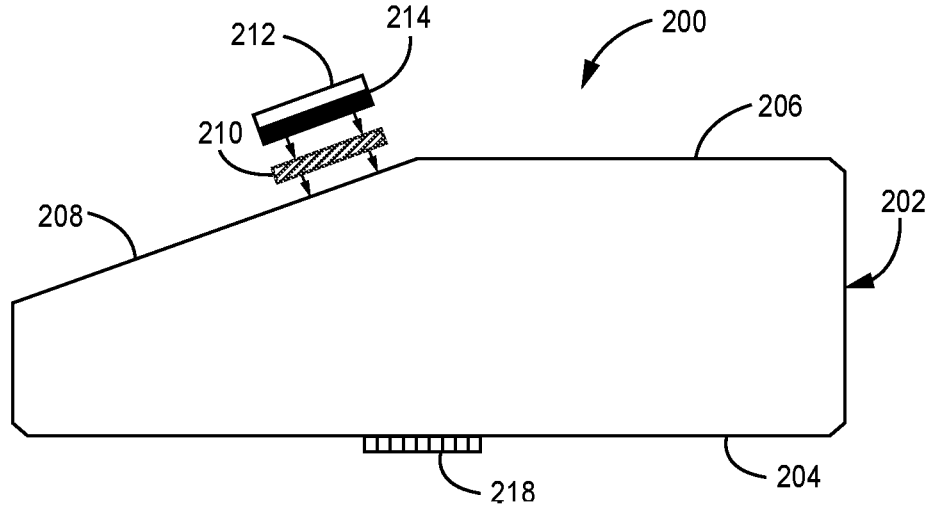
FIGS. 2A and 2B are schematic side views of an exemplary reflector member of a readout mirror for a ring laser gyroscope.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and assembly to reduce external cavity laser light scattering sources in ring laser gyroscopes is described herein. The present method provides a way to minimize external cavity backscatter sources in a cost effective and practical way. By reducing external cavity backscatter, the performance capability of a ring laser gyroscope is enhanced.

A ring laser gyroscope generally includes a laser block assembly, which can be triangular-shaped, with the laser block assembly having a resonant cavity therein such as a triangular cavity. The ring laser gyroscope further includes a set of multilayer mirrors, which are positioned at respective corners of the laser block assembly. The cavity is configured in conjunction with the multilayer mirrors to form a ring-shaped optical path around the laser block assembly. The cavity is filled with a suitable gas mixture, such as helium and neon, which are used to generate a laser beam in the cavity using standard techniques. The laser beam is directed around the optical path by the mirrors such that two counter-propagating beams are produced that travel in opposite directions relative to each other around optical path. The ring laser gyroscope includes an optical readout device with a wedge-shaped readout mirror, which couples a portion of the counter-propagating beams out from the resonant cavity and converts the beams to voltage signals from which rotation information can be obtained. The wedge-shaped readout mirror includes a multilayer beam splitter coating on a backside wedge angle surface.

It is known that defects within the beam splitter coating can result in external back scatter. In addition, a polish condition of the backside wedge angle surface can impact the performance of the beam splitter coating, producing an asymmetric scatter source. Achieving a high grade polish condition on this backside wedge angle surface is challenging and/or costly.

The present solution works around the current challenges of achieving high grade polish on a wedge angle surface of a readout mirror. The present approach overcomes the above difficulties by providing an optical part having a flat surface, and performing a super polish of the flat surface of the optical part. A high quality beam splitter coating is then applied to the super polished flat surface of the optical part, and a coarse polish or other cost-effective polish is applied to the wedge angle surface of the readout mirror. The beam splitter coated optical part is then bonded to the wedge angle surface with a refractive index matching optical adhesive. The viscosity of the optical adhesive can be selected such that any substrate polish defects, such as scratch and digs on the coarse polished wedge angle surface, are filled in and smoothed out such that unintended beam scattering is minimized.

Even though the present approach introduces another component to the ring laser gyroscope, the added component is much simpler to produce to the degree necessary to mitigate unintended external laser scattering back into the gyroscope cavity.

Further details of various embodiments are described hereafter and with reference to the drawings.

FIG. 1 is a flow diagram of a method 100 for making a reflector member of a readout mirror for a ring laser gyroscope, according to one implementation. The method 100 comprises forming an optical substrate component that includes a lower surface, a first upper surface portion that is substantially parallel to the lower surface, and a second upper surface portion that is angled with respect to the lower surface (block 110). The method 100 further comprises performing a coarse polish of the second upper surface portion of the optical substrate component (block 120); forming an optical part having a first surface (block 130);

and performing a super polish of the first surface of the optical part (block 140). The method 100 also comprises applying a beam splitter layer to the super polished first surface of the optical part, to produce a beam splitter side of the optical part (block 150). The method 100 bonds the beam splitter side of the optical part, using an optical adhesive, to the coarse polished second upper surface portion of the optical substrate component, to produce a reflector member that is configured to reduce external cavity light scattering in the ring laser gyroscope (block 160). A refractive index of the optical adhesive when cured matches a refractive index of the optical part.

Figure 2B:
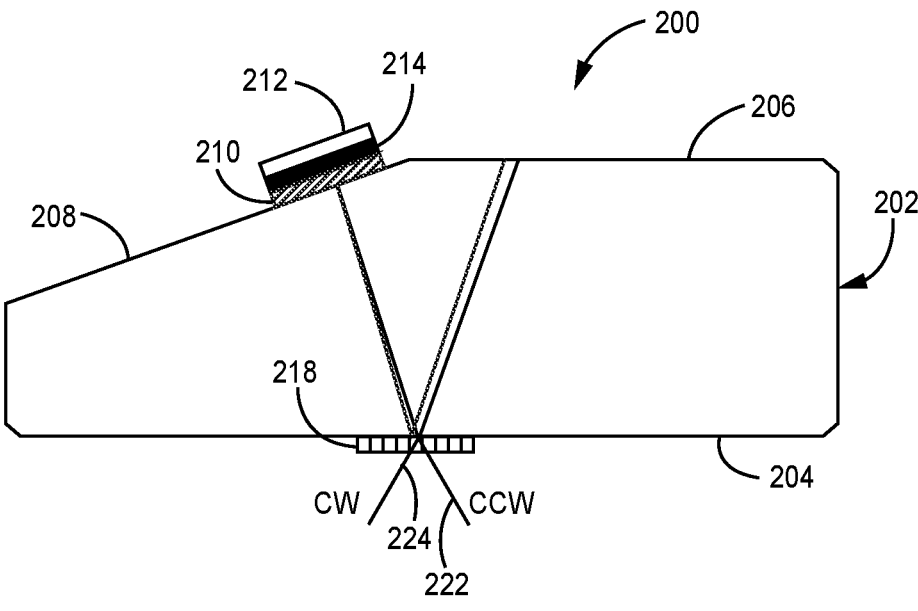

FIGS. 2A and 2B illustrate an exemplary reflector member 200 of a readout mirror for a ring laser gyroscope, which can be made according to the method of FIG. 1. The reflector member 200 includes an optical substrate component 202, which has a lower surface 204, a first upper surface portion 206 that is substantially parallel to lower surface 204, and a second upper surface portion 208 that is angled with respect to lower surface 204. The optical substrate component 202 is composed of a mechanically and thermally stable material, which is optically transmissive, such as glass, a glass ceramic material such as Zerodur® glass-ceramic, or the like. The optical substrate component 202 can have a substantially wedge-shaped structure, or the like.

An optical adhesive layer 210 is on second upper surface portion 208 of optical substrate component 202. An optical part 212 is bonded to second upper surface portion 208 by optical adhesive layer 210. The optical part can be composed of glass, Zerodur® glass-ceramic, or the like. The optical part 212 is sized to cover at least a portion of second upper surface portion 208 of the optical substrate component 202. A first beam splitter layer 214 is on a surface of optical part 212 that faces upper surface portion 208. A second beam splitter layer 218 is on lower surface 204 of optical substrate component 202.

During manufacture of reflector member 200, a coarse polish is applied to second upper surface portion 208 of optical substrate component 202. The coarse polish can be applied by a process that includes standard optical glass polish methods. In addition, a super polish is applied to a first planar surface of optical part 212. The super polish can be applied by a process that includes standard optical glass polish methods. In some embodiments, the super polish provide a surface that is "atomically smooth" such that surface roughness can be measured in Angstroms.

The first beam splitter layer 214 is applied to the super polished surface of optical part 212, such as through standard thin film forming techniques, to produce a beam splitter side of optical part 212. The beam splitter side of optical part 212 is bonded, using optical adhesive layer 210, to the coarse polished second upper surface portion 208 to produce reflector member 200.

The optical adhesive layer 210 can be composed of an optical adhesive material such as a refractive index matching adhesive having glass index refractive matching properties. The optical adhesive layer 210 is selected to have a viscosity such that scratch and digs on the coarse polished second upper surface portion 208 are filled in with the optical adhesive material. A refractive index of optical adhesive layer 210 when cured matches a refractive index of optical part 212.

FIG. 2B illustrates the operation of reflector member 200 when used in a readout mirror for a ring laser gyroscope. A first portion of a laser beam in a cavity of the ring laser gyroscope propagates in a counterclockwise (CCW) direction as a CCW beam 222, and a second portion of the laser beam propagates in a clockwise (CW) direction as a CW beam 224. A portion of CCW beam 222 is coupled out of the cavity into reflector member 200 through second beam splitter layer 218 and travels to first beam splitter layer 214, which partially reflects the portion of CCW beam 222 as a reflected CCW beam back to second beam splitter layer 218, which in turn reflects the reflected CCW beam toward first upper surface portion 206, which functions as an output port. In addition, a portion of CW beam 224 is coupled out of the cavity into reflector member 200 through second beam splitter layer 218 such that the portion of CW beam 224 travels toward first upper surface portion 206. The reflector member 200 operates such that external cavity laser light scattering is reduced or mitigated when the reflected CCW beams travel through optical substrate component 202.

Figure 3:
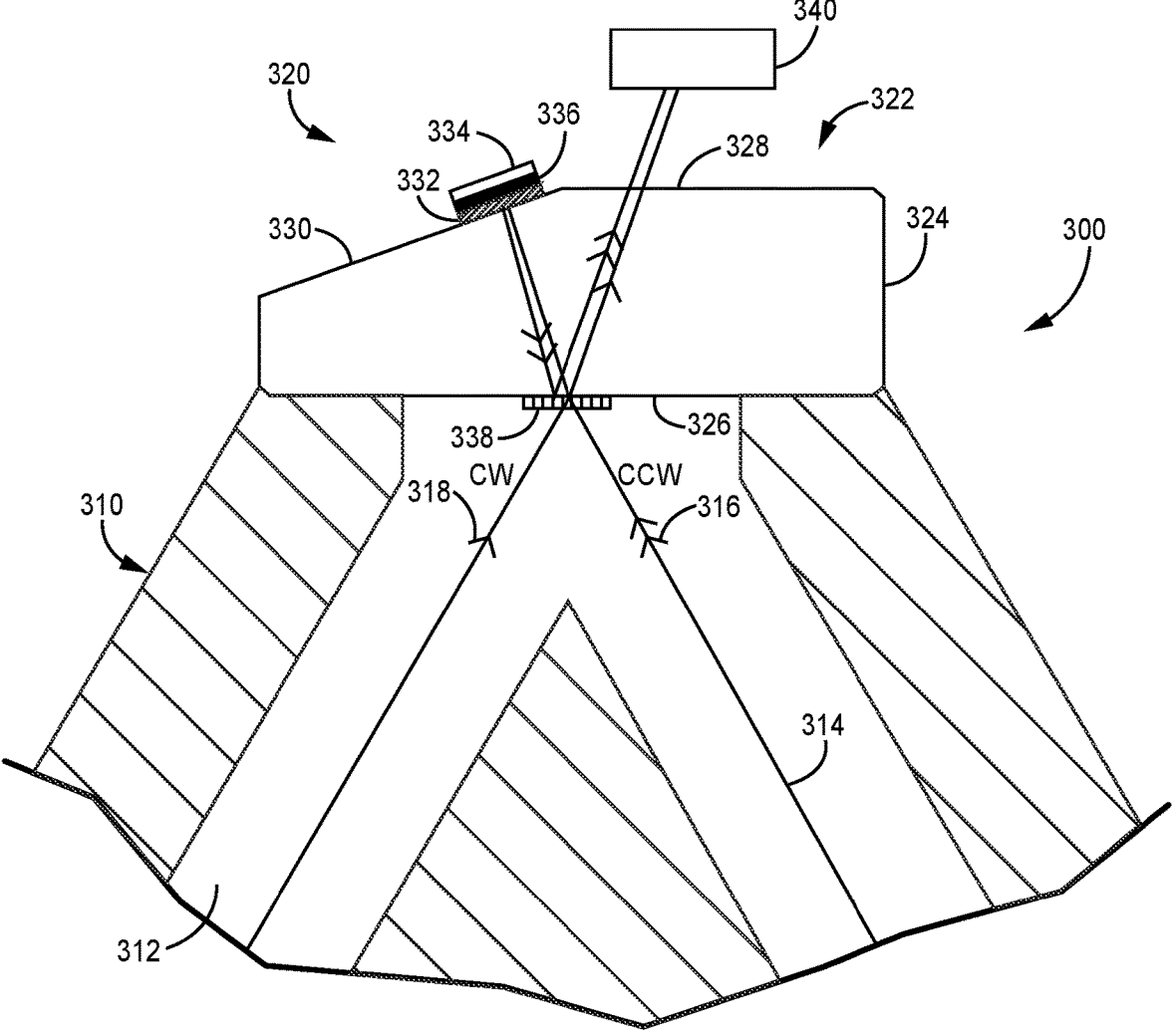
FIG. 3 is a partial sectional view of a ring laser gyroscope, according to one embodiment.

FIG. 3 is a partial sectional view of a ring laser gyroscope 300, according to one embodiment. The ring laser gyroscope 300 includes a laser block assembly 310 having a cavity 312 therein, and an optical readout device 320 in optical communication with cavity 312. The laser block assembly 310 is composed of a mechanically and thermally stable material such as Zerodur® glass-ceramic. In one implementation, laser block assembly 310 has triangular configuration such that cavity 312 is a substantially triangular-shaped cavity. The cavity 312 is sealed and filled with a suitable gas mixture, such as helium and neon, which are used to generate a laser beam 314 in cavity 312 according to standard techniques. The cavity 312, in conjunction with a set of multilayer mirrors (not shown) and optical readout device 320, provide an optical path for laser beam 314 in laser block assembly 310.

The optical readout device 320 includes a reflector member 322 comprising an optical substrate component 324 that includes a lower surface 326, a first upper surface portion 328 substantially parallel to lower surface 326, and a second upper surface portion 330 that is angled with respect to lower surface 326. The optical substrate component 324 is composed of a mechanically and thermally stable material, which is optically transmissive, such as glass, Zerodur® glass-ceramic, or the like. The optical substrate component 324 can have a substantially wedge-shaped structure, or the like.

An optical adhesive layer 332 is on second upper surface portion 330 of optical substrate component 324. An optical part 334 is bonded to second upper surface portion 343 by optical adhesive layer 332. The optical part can be composed of glass, Zerodur® glass-ceramic, or the like. The optical part 334 is sized to cover at least a portion of second upper surface portion 330. A first beam splitter layer 336 is on a surface of optical part 334 that faces upper surface portion 330. A second beam splitter layer 338 is on lower surface 326 of optical substrate component 324.

The first upper surface portion 328 of optical substrate component 324 is configured as an output port for optical readout device 320. The reflector member 322 is configured to reduce light scattering of laser beam 314 in cavity 312 of laser block assembly 310. The optical readout device 320 also includes an optical detector 340 in optical communication with reflector member 322 through first upper surface portion 328.

During operation of ring laser gyroscope 300, a first portion of laser beam 314 in cavity 312 propagates in a CCW direction as a CCW beam 316 (double arrowhead), and a second portion of laser beam 314 propagates in a CW direction as a CW beam 318 (single arrowhead). A portion of CCW beam 316 is coupled out of the cavity 312 into reflector member 322 through second beam splitter layer 338 and travels to first beam splitter layer 336, which partially reflects the portion of CCW beam 316 as a reflected CCW beam (double arrowhead) back to second beam splitter layer 338, which in turn reflects the reflected CCW beam toward first upper surface portion 328, which functions as the output port for the exiting CCW beam. In addition, a portion of CW beam 318 is coupled out of cavity 312 into reflector member 322 through second beam splitter layer 338 such that the portion of CW beam 318 travels toward first upper surface portion 328 and exits therefrom. The beams exiting from first upper surface portion 328 impinge upon optical detector 340 to form interference patterns, or fringes, which are sensed by optical detector 340 as an indication of the rotation of the ring laser gyroscope about an axis. The reflector member 322 operates such that external cavity laser light scattering is reduced or mitigated in laser block assembly 310 when the reflected CCW beams travel through optical substrate component 324.

Example Embodiments

Example 1 includes a method of making a readout mirror for a ring laser gyroscope, the method comprising: forming an optical substrate component that includes a lower surface, a first upper surface portion that is substantially parallel to the lower surface, and a second upper surface portion that is angled with respect to the lower surface; performing a coarse polish of the second upper surface portion of the optical substrate component; forming an optical part having a first surface; performing a super polish of the first surface of the optical part; applying a first beam splitter layer to the super polished first surface of the optical part, to produce a beam splitter side of the optical part; and bonding the beam splitter side of the optical part, using an optical adhesive, to the coarse polished second upper surface portion of the optical substrate component, to produce a reflector member for the readout mirror; wherein the reflector member is configured to reduce external cavity light scattering in the ring laser gyroscope.

Example 2 includes the method of Example 1, wherein the optical substrate component comprises glass, or a glass ceramic material.

Example 3 includes the method of any of Examples 1-2, wherein the optical substrate component has a substantially wedge-shaped structure.

Example 4 includes the method of any of Examples 1-3, wherein the optical part comprises glass, or a glass ceramic material.

Example 5 includes the method of any of Examples 1-4, wherein the optical part is sized to cover at least a portion of the second upper surface portion of the optical substrate component.

Example 6 includes the method of any of Examples 1-5, wherein: the optical adhesive has a viscosity such that scratch and digs on the coarse polished second upper surface portion are filled in with the optical adhesive; and a refractive index of the optical adhesive when cured matches a refractive index of the optical part.

Example 7 includes the method of any of Examples 1-6, wherein the optical adhesive has glass index refractive matching properties.

Example 8 includes the method of any of Examples 1-7, further comprising forming a second beam splitter layer on the lower surface of the optical substrate component.

Example 9 includes an optical readout device for a ring laser gyroscope, the optical readout device comprising: a reflector member comprising: an optical substrate component including a lower surface, a first upper surface portion substantially parallel to the lower surface, and a second upper surface portion that is angled with respect to the lower surface; an optical adhesive layer on the second upper surface portion of the substrate component; an optical part bonded to the second upper surface portion of the substrate component by the optical adhesive layer; and a first beam splitter layer on a surface of the optical part; wherein the reflector member is configured to reduce external cavity light scattering in the ring laser gyroscope.

Example 10 includes the optical readout device of Example 9, wherein the optical substrate component comprises glass, or a glass ceramic material.

Example 11 includes the optical readout device of any of Examples 9-10, wherein the optical substrate component has a substantially wedge-shaped structure.

Example 12 includes the optical readout device of any of Examples 9-11, wherein the optical part comprises glass, or a glass ceramic material.

Example 13 includes the optical readout device of any of Examples 9-12, wherein the optical adhesive layer has glass refractive index matching properties.

Example 14 includes the optical readout device of any of Examples 9-13, further comprising a second beam splitter layer on the lower surface of the optical substrate component.

Example 15 includes a ring laser gyroscope, comprising: a laser block assembly having a cavity therein; a set of multilayer mirrors in optical communication with the cavity; an optical readout device in optical communication with the cavity, the optical readout device including a reflector member comprising: an optical substrate component that includes a lower surface, a first upper surface portion substantially parallel to the lower surface, and a second upper surface portion that is angled with respect to the lower surface; an optical adhesive layer on the second upper surface portion of the substrate component; an optical part bonded to the second upper surface portion of the substrate component by the optical adhesive layer; a first beam splitter layer on a surface of the optical part; and a second beam splitter layer on the lower surface of the optical substrate component; wherein the cavity, in conjunction with the multilayer mirrors and the optical readout device, provide an optical path for a laser beam in the laser block assembly; wherein the first upper surface portion of the optical substrate component is configured as an output port for the optical readout device; wherein the reflector member is configured to reduce light scattering of the laser beam in the cavity of the laser block assembly.

Example 16 includes the ring laser gyroscope of Example 15, wherein the optical substrate component has a substantially wedge-shaped structure.

Example 17 includes the ring laser gyroscope of any of Examples 15-16, wherein a first portion of the laser beam in the cavity propagates in a counterclockwise (CCW) direction as a CCW beam, and a second portion of the laser beam propagates in a clockwise (CW) direction as a CW beam.

Example 18 includes the ring laser gyroscope of Example 17, wherein: a portion of the CCW beam is coupled out of the cavity into the reflector member through the second beam splitter layer and travels to the first beam splitter, which partially reflects the portion of the CCW beam as a reflected CCW beam back to the second beam splitter, which in turn reflects the reflected CCW beam toward the output port; and a portion of the CW beam is coupled out of the cavity into the reflector member through the second beam splitter layer such that the portion of the CW beam travels toward the output port.

Example 19 includes the ring laser gyroscope of any of Examples 15-18, wherein the multilayer mirrors and the optical readout device are positioned at respective corners of the laser block assembly.

Example 20 includes the ring laser gyroscope of any of Examples 15-19, wherein the cavity of the laser block assembly is a substantially triangular-shaped cavity.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of making a readout mirror for a ring laser gyroscope, the method comprising:
    forming an optical substrate component that includes a lower surface, a first upper surface portion that is substantially parallel to the lower surface, and a second upper surface portion that is angled with respect to the lower surface;
    performing a first coarse polish of the second upper surface portion of the optical substrate component;
    forming an optical part having a first surface;
    performing a second super polish of the first surface of the optical part, the second super polish different from the first coarse polish, wherein the second super polish results in the first surface being atomically smooth such that the first surface has a surface roughness that can be measured in Angstroms;
    applying a first beam splitter layer to the polished first surface of the optical part, to produce a beam splitter side of the optical part; and
    bonding the beam splitter side of the optical part, using an optical adhesive, to the polished second upper surface portion of the optical substrate component, to produce a reflector member for the readout mirror;
    wherein the reflector member is configured to reduce external cavity light scattering in the ring laser gyroscope.

2. The method of claim 1, wherein the optical substrate component comprises glass, or a glass ceramic material.

3. The method of claim 1, wherein the optical substrate component has a substantially wedge-shaped structure.

4. The method of claim 1, wherein the optical part comprises glass, or a glass ceramic material.

5. The method of claim 1, wherein the optical part is sized to cover at least a portion of the second upper surface portion of the optical substrate component.

6. The method of claim 1, wherein:
    the optical adhesive has a viscosity such that scratch and digs on the polished second upper surface portion are filled in with the optical adhesive; and
    a refractive index of the optical adhesive when cured matches a refractive index of the optical part.

7. The method of claim 1, wherein the optical adhesive has glass index refractive matching properties.

8. The method of claim 1, further comprising forming a second beam splitter layer on the lower surface of the optical substrate component.

9. An optical readout device for a ring laser gyroscope, the optical readout device comprising:
    a reflector member comprising:
        an optical substrate component including a lower surface, a first upper surface portion substantially parallel to the lower surface, and a second upper surface portion that is angled with respect to the lower surface, the second upper surface portion having a first polished surface;
    an optical adhesive layer on the second upper surface portion of the optical substrate component;
    an optical part on the second upper surface portion of the optical substrate component, the optical part having a second polished surface that is different from the first polished surface, wherein the second polished surface is atomically smooth such that the second polished surface has a surface roughness that can be measured in Angstroms; and
    a first beam splitter layer on the second polished surface of the optical part to produce a beam splitter side of the optical part, wherein the beam splitter side of the optical part is bonded to the second upper surface portion of the optical substrate component by the optical adhesive layer;
    wherein the reflector member is configured to reduce external cavity light scattering of a laser beam in the ring laser gyroscope, when a reflected portion of the laser beam travels through the optical substrate component of the reflector member.

10. The optical readout device of claim 9, wherein the optical substrate component comprises glass, or a glass ceramic material.

11. The optical readout device of claim 9, wherein the optical substrate component has a substantially wedge-shaped structure.

12. The optical readout device of claim 9, wherein the optical part comprises glass, or a glass ceramic material.

13. The optical readout device of claim 9, wherein the optical adhesive layer has glass refractive index matching properties.

14. The optical readout device of claim 9, further comprising a second beam splitter layer on the lower surface of the optical substrate component.

15. A ring laser gyroscope, comprising:
    a laser block assembly having a cavity therein;
    an optical readout device in optical communication with the cavity, the optical readout device including a reflector member comprising:
        an optical substrate component including a lower surface, a first upper surface portion substantially parallel to the lower surface, and a second upper surface portion that is angled with respect to the lower surface, the second upper surface portion having a first polished surface;
        an optical adhesive layer on the second upper surface portion of the optical substrate component;
        an optical part on the second upper surface portion of the optical substrate component, the optical part having a second polished surface that is different from the first polished surface, wherein the second polished surface is atomically smooth such that the second polished surface has a surface roughness that can be measured in Angstroms;
        a first beam splitter layer on the second polished surface of the optical part to produce a beam splitter side of the optical part, wherein the beam splitter side of the optical part is bonded to the second upper surface portion of the optical substrate component by the optical adhesive layer; and
        a second beam splitter layer on the lower surface of the optical substrate component;

wherein the cavity, in conjunction with the optical readout device, provide an optical path for a laser beam in the laser block assembly;

wherein the first upper surface portion of the optical substrate component is configured as an output port for the optical readout device;

wherein the reflector member is configured to reduce light scattering of the laser beam in the cavity of the laser block assembly when a reflected portion of the laser beam travels through the optical substrate component of the reflector member.

16. The ring laser gyroscope of claim 15, wherein the optical substrate component has a substantially wedge-shaped structure.

17. The ring laser gyroscope of claim 15, wherein a first portion of the laser beam in the cavity propagates in a counterclockwise (CCW) direction as a CCW beam, and a second portion of the laser beam propagates in a clockwise (CW) direction as a CW beam.

18. The ring laser gyroscope of claim 17, wherein:

a portion of the CCW beam is coupled out of the cavity into the reflector member through the second beam splitter layer and travels to the first beam splitter, which partially reflects the portion of the CCW beam as a reflected CCW beam back to the second beam splitter, which in turn reflects the reflected CCW beam toward the output port; and a portion of the CW beam is coupled out of the cavity into the reflector member through the second beam splitter layer such that the portion of the CW beam travels toward the output port.

19. The ring laser gyroscope of claim 15, wherein the optical readout device is positioned at a corner of the laser block assembly.

* * * * *